US008006238B2

(12) United States Patent
Eichenberger et al.

(10) Patent No.: US 8,006,238 B2
(45) Date of Patent: Aug. 23, 2011

(54) WORKLOAD PARTITIONING IN A PARALLEL SYSTEM WITH HETERGENEOUS ALIGNMENT CONSTRAINTS

(75) Inventors: Alexandre E. Eichenberger, Chappaqua, NY (US); John Kevin Patrick O'Brien, South Salem, NY (US); Kathryn M. O'Brien, South Salem, NY (US); Tong Chen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 11/535,172

(22) Filed: Sep. 26, 2006

(65) Prior Publication Data
US 2008/0077930 A1      Mar. 27, 2008

(51) Int. Cl.
G06F 9/45 (2006.01)
G06F 9/40 (2006.01)
G06F 9/46 (2006.01)

(52) U.S. Cl. ........ 717/150; 717/149; 717/160; 712/204; 718/102; 718/104

(58) Field of Classification Search ................ 717/149, 717/150, 160; 712/204; 718/102, 104
See application file for complete search history.

(56) References Cited

U.S. PATENT DOCUMENTS

| | | | | |
|---|---|---|---|---|
| 5,463,748 A * | 10/1995 | Schwendinger | ............... | 712/204 |
| 6,026,239 A * | 2/2000 | Patrick et al. | ................. | 717/154 |
| 6,438,747 B1 * | 8/2002 | Schreiber et al. | ............. | 717/160 |
| 6,708,331 B1 * | 3/2004 | Schwartz | ..................... | 717/160 |
| 7,313,788 B2 * | 12/2007 | Ben-David et al. | ........... | 717/150 |
| 7,793,278 B2 * | 9/2010 | Du et al. | ....................... | 717/160 |
| 2005/0273769 A1 | 12/2005 | Eichenberger et al. | | |
| 2005/0273770 A1 | 12/2005 | Eichenberger et al. | | |
| 2005/0283769 A1 | 12/2005 | Eichenberger et al. | | |
| 2005/0283773 A1 | 12/2005 | Eichenberger et al. | | |
| 2005/0283774 A1 | 12/2005 | Eichenberger et al. | | |
| 2005/0283775 A1 | 12/2005 | Eichenberger et al. | | |
| 2007/0169058 A1 * | 7/2007 | Eichenberger et al. | ........ | 717/160 |
| 2008/0028189 A1 * | 1/2008 | Hoogerbrugge | .............. | 712/204 |

OTHER PUBLICATIONS

Eichenberger et al. (Optimizing Compiler for a CELL Processor, 14th International Conference on Parallel Architectures and Compilation Techniques (PACT'05), Sep. 2005).*
Wu et al. (An integrated simdization framework using virtual vectors, Proceedings of the 19th annual international conference on Supercomputing, Jun. 2005).*
Eichenberger et al. (Vectorization for SIMD Architectures with Alignment Constraints, Proceedings of the ACM SIGPLAN 2004 conference on Programming language design and implementation, Jun. 2004).*
Wu et al. (Efficient SIMD Code Generation for Runtime Alignment and Length Conversion, Proceedings of the international symposium on Code generation and optimization, Mar. 2005).*
Eichenberger et al. (Using advanced compiler technology to exploit the performance of the Cell Broadband Engine architecture, IBM Systems Journal, vol. 45, No. 1, 2006).*

(Continued)

*Primary Examiner* — Lewis A Bullock, Jr.
*Assistant Examiner* — Hang Pan
(74) *Attorney, Agent, or Firm* — Michael Le Strange; Roberts Mlotkowski Safran & Cole, P.C.

(57) ABSTRACT

A process, compiler, computer program product and system for workload partitioning in a heterogeneous system. The process includes determining heterogeneous alignment constraints in the workload, partitioning a portion of tasks to a processing element sensitive to alignment constraints, and partitioning a remaining portion of tasks to a processing element not sensitive to alignment constraints.

32 Claims, 7 Drawing Sheets

OTHER PUBLICATIONS

Chow et al. (A Programming Example: Large FFT on the Cell Broadband Engine, Proceeding of the 2005 Global Signal Processing Expo, Oct. 2005).*

Yang et al. (A Parallel Loop Self-Scheduling on Extremely Heterogeneous PC Clusters, Proceedings of the 2003 international conference on Computational science, 2003).*

Ioannidis et al. (Compiler and Run-Time Support for Adaptive Load Balancing in Software Distributed Shared Memory Systems, Proceeding LCR '98 Selected Papers from the 4th International Workshop on Languages, Compilers, and Run-Time Systems for Scalable Computers, 1998).*

U.S. Appl. No 11/470,638 (Eichenberger et al.), filed Sep. 7, 2006 and entitled, "Optimized Software Cache Lookup for SIMD Architectures".

U.S. Appl. No. 11/535,181 (Eichenberger et al.), filed Sep. 26, 2006 and entitled, "Generating Optimized SIMD Code in the Presence of Data Dependencies".

* cited by examiner loop:
for(i=1; i<8K+1; i++) a[i] =

(a)

Partition among 8 SPEs
SPE0: for(i=1; i<1K+1; i++) a[i] =
SPE1: for(i=1K+1; i<2K+1; i++) a[i] =
...
SPE x: for(i=1K*x+1; i<1K*x+1K+1; i++) a[i] =
...
SPE 7 = for(i=7K+1; i<8K+1; i++) a[i] =

(b)

WORKLOAD PARTITIONING IN A PARALLEL SYSTEM WITH HETERGENEOUS ALIGNMENT CONSTRAINTS

FIELD OF THE INVENTION

The invention generally relates to a method, product and system for workload partitioning in a parallel system with heterogeneous alignment constraints such as the Cell Broadband Engine.

BACKGROUND OF INVENTION

Computer processors function by processing data elements through various registers in accordance with instructions provided by a computer program. The processor executes instructions in the form of machine language, which are the low-level instructions relating to what data elements are processed through which registers. Most software, however, is written in higher-level programming code, such as C++, which has the advantages of being human readable and of embodying relatively complex processing operations using comparatively short, quickly-written commands. A compiler receives the high-level programming code, and based upon the programming of the compiler itself, generates the machine language that is readable by a processor.

Workload partitioning focuses on distributing work known to be parallel among the multiple processing elements of a system. Processing elements can be threads executing on a single processor, multiple processors in a single core, multiple processors in different cores, or any combinations of the above.

When partitioning computations among processing elements, prior work typically takes into consideration maximum job size, load balancing, and latency hiding. For example, when a memory subsystem works best with a given working set size of K bytes, the partitioning algorithm typically chunk the work in subsets of units, each of which have a working set size smaller or equal to K bytes. Another example of consideration is load balancing, where a partition algorithm attempts to partition the work among processing elements as evenly as possible. A third consideration is latency hiding, in which the partition algorithm splits the work in smaller chunks than fitting in the maximum working set size so that several tasks are in flight at a given time for a given processing element. For example, one task in flight may be in the process of transmitting the input data to that processing element, either with DMA or prefetching, while a second task in flight may be computing the output data, and a third task in flight may be transmitting the output back to the memory subsystem or other processing element.

While workload partitioning is generally well understood for homogenous systems where all the processing elements have similar characteristics, for heterogeneous systems where similar processing elements are clustered at various levels in a clustered architecture, there is a new class of processing elements such as the ones present in the Cell Broadband Engine (CBE) that are introducing a new set of heterogeneous constraints that can significantly impact the overall system performance when such heterogeneous constraints are not taken into accounts while partitioning the work among processing elements in the parallel system.

SUMMARY OF THE INVENTION

According to an aspect of the invention, a process of workload partitioning in a heterogeneous system includes determining heterogeneous alignment constraints in the workload and system, partitioning first tasks to at least one alignment constrained processing element (ACPE), and partitioning second tasks to at least one non-alignment constrained processing element (NACPE).

In an embodiment of the invention, the ACPE can include one or more synergistic processing element (SPE) and the NACPE can include one or more power processor element (PPE).

In embodiments of the invention, workload may include at least one parallel loop or any parallel regions that could be expressed as one or more loops, and the determining of the heterogeneous alignment constraints can include finding whether there is an alignment boundary between the first tasks and the second tasks. Further, when an alignment boundary is found between the first and second tasks at a beginning of the loop, all iterations of the loop can be assigned to a NACPE until at least one of a first alignment boundary or a subsequent alignment boundary is crossed. Moreover, when an alignment boundary is found between the first and second tasks at an end of the loop, all iterations of the loop past at least one of a last alignment boundary or a prior alignment boundary are assigned to a NACPE. In further embodiments, the at least one loop can include one of loops with single alignment or loops with multiple alignments. For loops with multiple alignments, the process can include transforming the loops with multiple alignments into loops with a unique alignment for the purpose of facilitating the partition of work among ACPE and NACPE. The first and second tasks can be partitioned from one of an original loop composed of the loops with single alignment and the transformed loops composed of the loops with multiple alignments that have been transformed into loops with a unique alignment.

In embodiments of the invention, the workload may include at least one loop, and, when a first iteration of the at least one loop does not result in an aligned access with respect to an alignment boundary, a NACPE can be assigned at least the first iteration.

In further embodiments of the invention, the workload can include at least one loop, and, when a last iteration of the at least one loop does not result in an aligned access with respect to an alignment boundary, a NACPE is assigned at least the last iteration.

In further embodiments of the invention, the workload can include at least one loop, at least one of a first iteration and a last iteration of the at least one loop can be partitioned to a NACPE.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

In a heterogeneous or parallel system, which includes processing elements sensitive to alignment and processing elements not sensitive to alignment, workload partitioning by a compiler cuts up or divides tasks into smaller chunks for each processor. Moreover, in heterogeneous systems, alignment constraints are considered so that workload is partitioned to certain processors with alignment constraints (alignment constrained processing elements (ACPE)) and to certain processors without alignment constraints (non-alignment constrained processing elements (NACPE)). For example, tasks with alignment constraints are divided up for the SPEs to process, while the remaining tasks are assigned to the PPE.

Figure 1:
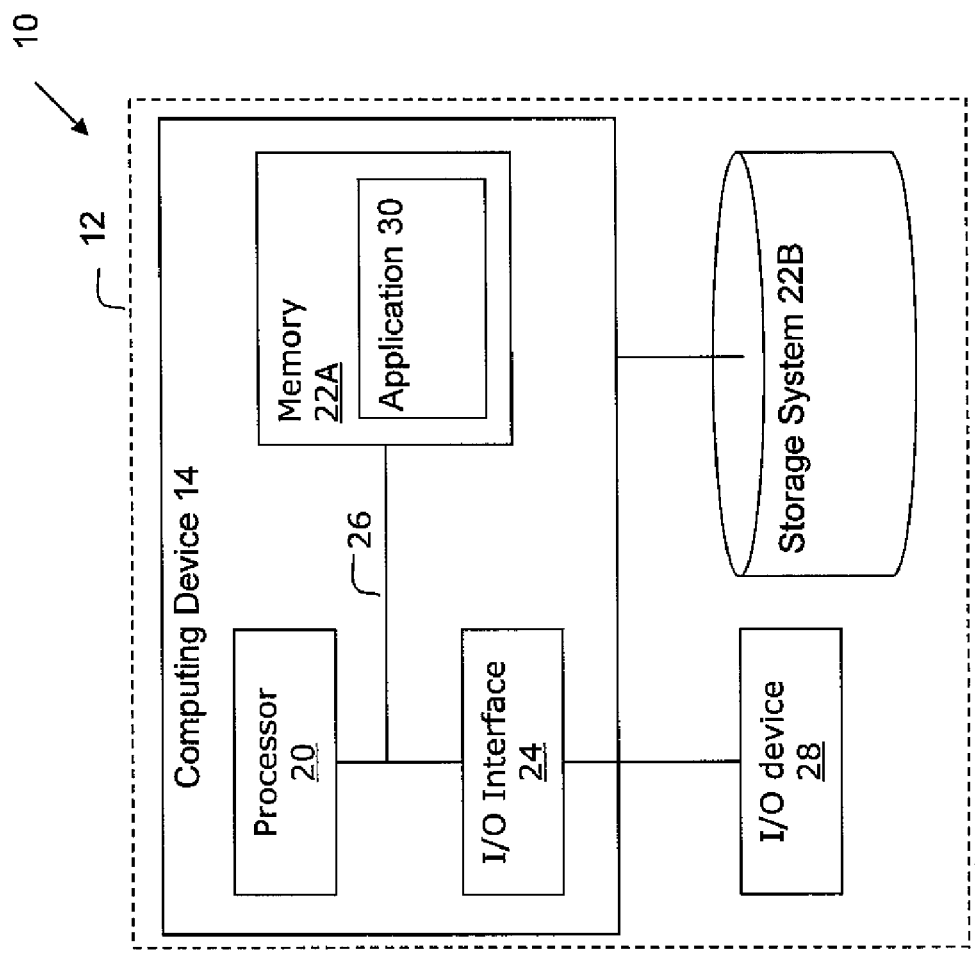
FIG. 1 shows an illustrative environment according to aspects of the invention.

FIG. 1 shows an illustrative environment 10 for managing the processes in accordance with embodiments of the invention. To this extent, the environment 10 includes a computer infrastructure 12 that can perform the processes described herein, such as, for example, generating optimized SIMD code. In particular, the computer infrastructure 12 is shown including a computing device 14 that comprises an application 30, which makes computing device 14 operable to perform at least some of the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to perform the processes described herein, such as, for example, generating optimized SIMD code. In embodiments, the application 30 comprises compiler software that is capable of performing the processes described herein.

Figure 2:
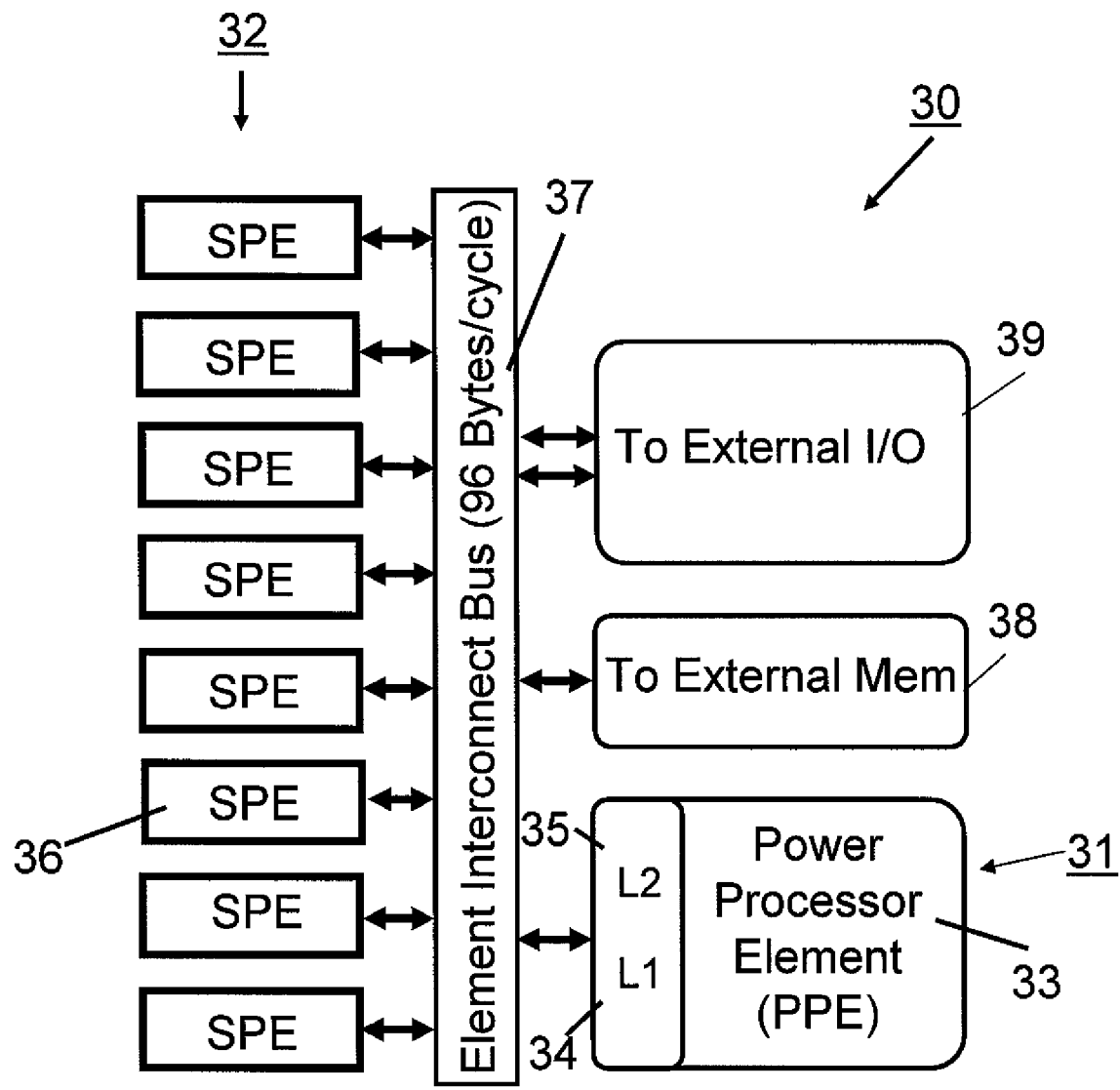
FIG. 2 illustrates a Cell Broadband Engine for the invention.

According to an embodiment of the invention illustrated in FIG. 2, a Cell Broadband Engine 30 is utilized, which is composed of a multi-threaded power processor 31 and at least one, e.g., eight, compute-intensive ISA engines 32. Power processor 31 can include a power processor element (PPE) 33 having a level 1 cache 34 and a level 2 cache 35. The compute-intensive ISA engines can be synergistic processing elements (SPE) 36, which are single input multiple data (SIMD) only engines. SPE 36 is a fast processor with local memory that provides fast access to, e.g., 256 kB local memories. However, nothing is stored in these local memories without explicit instructions to do so through a direct memory access (DMA) request to transfer data. An element interconnect bus 37 is provided to interconnect multi-threaded power processor 31, ISA engines 32, and at least two configurable interfaces, e.g., to provide access to external memory 18 and to external input/output devices 39. The level 1 and level 2 caches 34 and 35 of PPE 33, SPEs 36, and the external memory 38 and devices 39 are coupled to element interconnect bus 37 to transfer 8 bytes per direction, whereas element interconnect bus can transfer, e.g., 96 bytes/cycle.

Moreover, Cell Broadband Engine 30 is advantageous in that it has a high bandwidth. For example, with a clock rate of 3.2 GHz, element interconnect bus operates at 200 GB/s and the data transfer from bus to element is 76.8 GB/s.

The CBE is an example of a heterogeneous or parallel system since it includes processing elements that are alignment sensitive and processing elements that are not alignment sensitive. By way of example, for SPEs, alignment matters, i.e., performance can vary greatly depending upon where the chunks of data assigned to the SPE start and end, whereas for PPEs, alignment does not matter, i.e., performance does not greatly vary depending upon where the chunks of data assigned to the PPE start and end. Thus, in contrast to the SPE, the PPE is a power architecture processing element that can access system memory in an arbitrary fashion.

Figure 3:
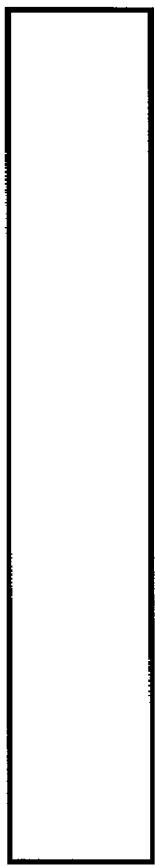
FIGS. 3a and 3b illustrate an example of load partitioning.
Figure 3:
Figure 3:
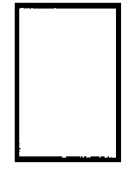

The partitioning of tasks is illustrated in FIGS. 3a and 3b. In this example, the actual computations in the SPE elements will be quite different depending on the actual alignment of the data. FIG. 3a illustrates the loop for (i=0; i<8K; i++) a[i+1], while FIG. 3b illustrates partitioning of the loop. If the work was simply partitioned to each of the 8 SPE (with PID=0 to 7), then each of the SPE would be assigned the computation for (i=1K*PID; i<1K*(PID+1); i++) a[i+1]. Thus, the workload for SPEx would be partitioned to process the portion of the loop for (i=1K*x+1; i<1K*x+1K+1; i++) a[i], where 1K=1024 and where x is in the 0 to 7 range, inclusively.

A first example of heterogeneous constraints is the alignment constraints found on SIMD units present in the SPEs but not on the scalar units of the PPEs. The alignment constraints due to SIMD units are described as follows. When a SIMD memory operation is performed, the lower 4 bits of the address are discarded and the SIMD units load and store 16 bytes of data from/to this truncated address. This has significant consequences when parallelizing code among the SIMD only SPEs, as this truncating of address and mandatory 16-byte reading and writing of memory can generate false sharing conditions at the boundaries of tasks between two SPEs. More precisely, unless properly taken care of, each SPE must take additional steps to keep track of which value within a 16 byte boundary is written so that, when a particular SPE is only responsible for generating a subset of these 16 bytes, it does not accidentally clobber the values that this particular SPE is not responsible for.

A second example of heterogeneous constraints is the alignment constraints that are found on the DMA engines which are the sole means for the SPEs of getting data from and to the system memory, whereas the PPEs can access system memory without experiencing such alignment constraints. The DMA engine moves memory from one location to another. In the parallel machine context, data is moved from a remote memory to a local memory to operate on the local memory, whereas the converse is also true, i.e., the DMA moves results stored in the local memory back to the remote/global memory. The DMA moves system memory quantities as small as a single byte and as large as 16 kilobytes. However, a DMA request cannot cross a boundary that is a multiple of the data size transferred.

Figure 4A:
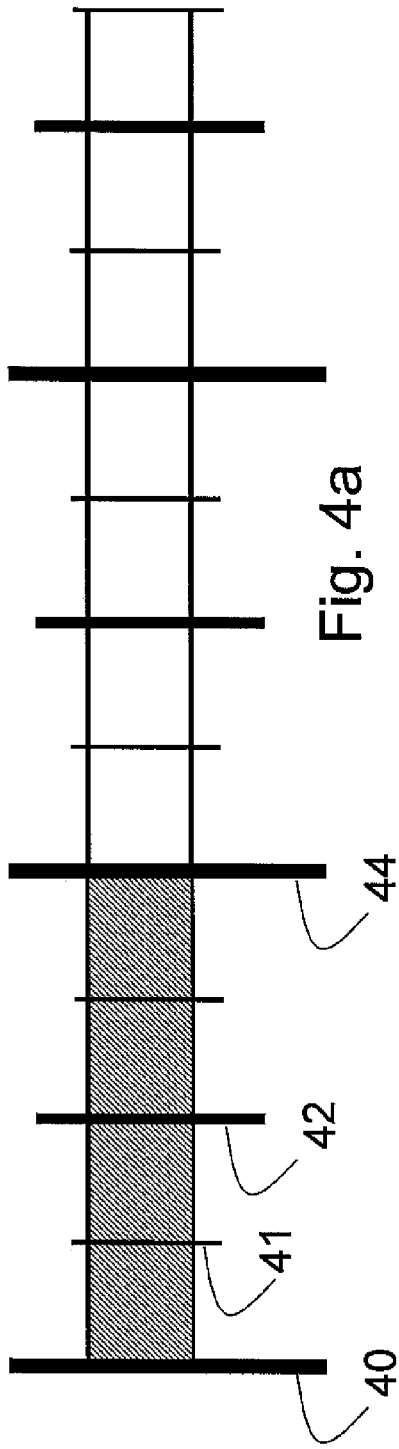
FIGS. 4a and 4b respectively illustrate well aligned and not well aligned alignment constraints.
Figure 4B:
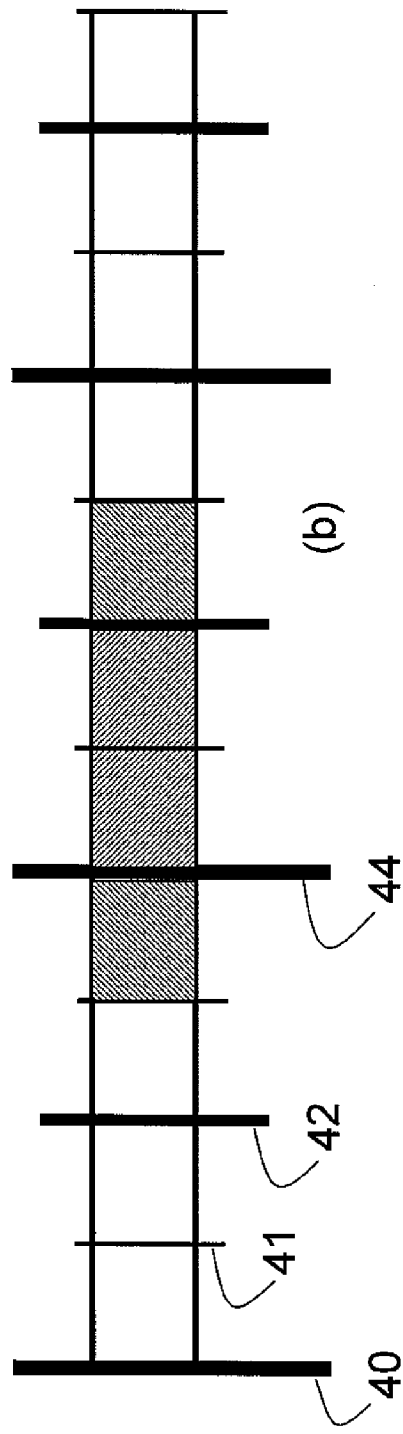

For example, as illustrated in FIGS. 4a and 4b, the 1 byte, 2 byte, and 4 byte boundaries are identified as 41, 42, and 44, respectively, from an initial or beginning point 40. FIG. 4a shows a well aligned transfer of 4 bytes, such that the transferred 4 byte data does not straddle the 4 byte boundary, but fits between point 0 and point 4. Thus, this transfer can be performed in a single DMA request. In contrast, FIG. 4b illustrates a not well aligned transfer of 4 bytes. In this regard, because the transferred data will straddle the 4 byte boundary, it will be necessary to break up the 4 bytes into multiple DMA requests. Thus, for the transfer to be performed, a 1 byte chunk is loaded in front of the 4 byte boundary in a first DMA request, a 2 byte chunk is loaded within the 2 byte boundary following 4 byte boundary 4 in a second DMA request, and the final 1 byte chunk is loaded after the 2 byte chunk in a third DMA request. As a result, the non-aligned 4 byte transfer depicted in FIG. 4b requires three separate DMA requests, while the aligned 4 byte transfer depicted in FIG. 4a is completed in a single DMA request.

Because of the alignment constraints of the SPE memory subsystem, this data partitioning would incur boundary issues. Assuming that the array "a" in Table 1 is aligned at 16 byte boundaries (typically the case in alignment aware compilers), SPE 1 needs to write elements a1025, a1026, and a2027, but not a1024 as a1024 actually belongs to SPE 0, i.e., 0-1K (1024). Thus, SPE 1 cannot use a straightforward 16-byte SIMD store as store operation only write to 16-byte aligned memory location which in this case would encompass a1024 . . . a1027.

The drawback of this special code is that it results in slower code, especially for the first and last iterations assigned to each processing elements with alignment constraints. In addition, the dedicated code adds to complexity and memory requirement for the code.

Figure 5:
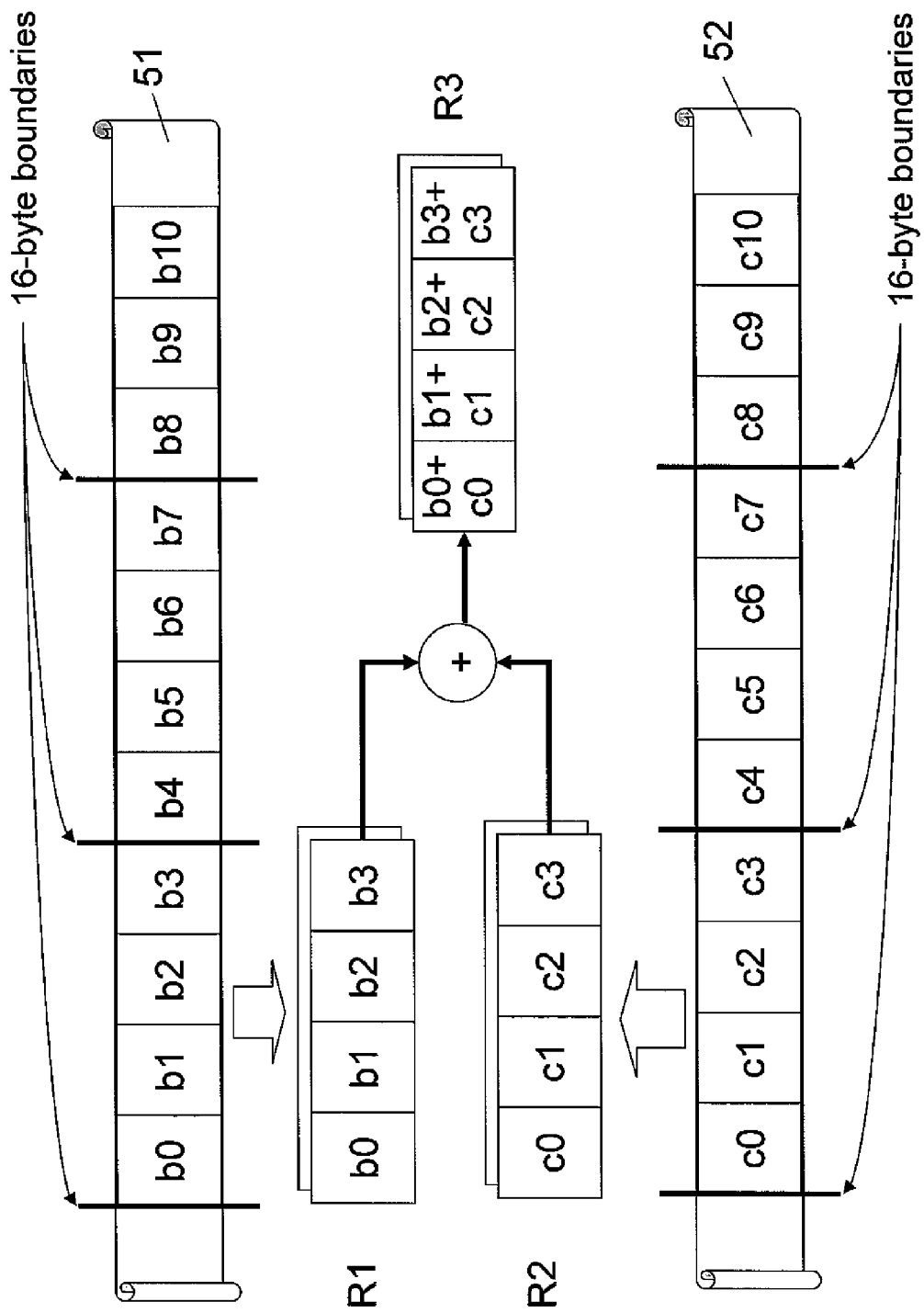
FIG. 5 illustrates an example of an aligned SIMD operation.

FIG. 5 illustrates an example of alignment constraints in a SIMD computation process for the loop b[i]+c[i]. As shown, the data in memories 51 and 52 are loaded in chunks corresponding to an alignment boundary, e.g., 16 bytes, into SIMD or vector registers R1 and R2, and the sum of these registers is loaded into SIMD or vector register R3. In this example, the computation is well aligned, such that the chunks of data do not cross the 16 byte boundary.

Figure 6:
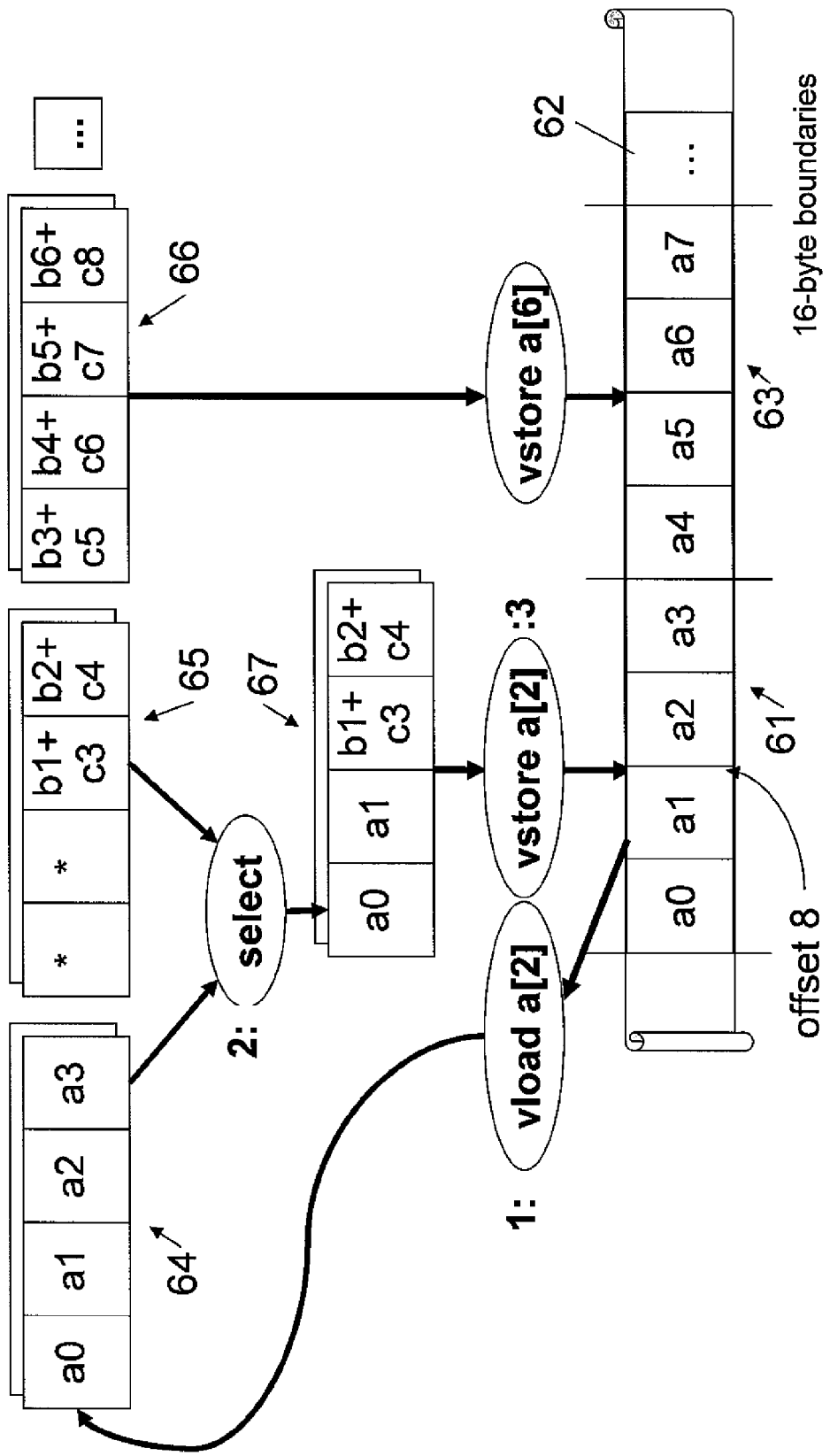
FIG. 6 illustrates an example of a SIMD operation with a not aligned alignment constraints.

In contrast, FIG. 6 illustrates a further example of alignment constraints in a SIMD computation process for the loop (i=0;i<65;i++) a[i+2]=b[i+1]+c[i+3], which is not well aligned, since for i=0, the loop begins at a[2], which is in the middle of the alignment boundary 61. As illustrated, the scroll represents local memory in which the first two alignment boundaries 61 and 63, containing addresses a0-a7 are shown, and this information will be modified according to the above-noted loop. From the loop, it is apparent that no data would be available for a0 or a1, since the loop begins in the middle of the boundary with a2. Thus, an offset, e.g., 8 bytes in this exemplary 16 byte alignment boundary, is determined, which would be difficult for an alignment sensitive processor to process. Moreover, it is apparent that at i=2, the loop is at a4, or the beginning of the next alignment boundary.

The first chunk of data, e.g., 16 bytes, is loaded into a SIMD register 64, and the first chunk of the loop, e.g., 16 bytes, is combined and loaded into a SIMD register 65 using a conventional SIMD operation. It is noted that the first two 4 byte chunks of the combined and loaded SIMD register 65 are blank since values a0 and a1 are garbage values before the first computation. However, for the purpose of alignment, these garbage values are included in the combined and loaded SIMD register 65. The next chunk of the SIMD computation is loaded into SIMD register 66. Next, the desired values in the SIMD registers are selected, i.e., a0, a1, b1+c3, b2+c4, and loaded into a SIMD register 67. SIMD register 67 with the selected values are stored into the first alignment boundary of the local memory. Thereafter, the SIMD computations for i=2+, i.e., a4-a7, a8-a11, etc., are loaded through direct storage into the local memory in corresponding chunks.

This operation is performed by software running in the compiler to "chunk up" work, or can be done at run time when parameter is not known beforehand, i.e., at compile time.

In the above exemplary embodiment of Table 1, the compiler determines the compile time alignment of the array "a"

TABLE 1

|  | SPE0 | SPE1 | SPE2 | ... | SPE6 | SPE7 |
|---|---|---|---|---|---|---|
| a[i] computed | 1 ... 1024 | 1025 ... 2048 | 2049 ... 3072 | ... | 6145 ... 7168 | 7169 ... 8192 |

Because of that, special code would need to be issued that generates the couple of initial and last values assigned to each processor in a sequential way, for example, if the data is part of a globally coherent memory subsystem either using dedicated hardware support (typically a globally coherent cache subsystem) or dedicated software support (typically software cache system).

as well as the alignment of its reference "a[i+1]" in the loop. In view of this known alignment, the present invention provides it is best to assign the first 3 iterations as well as the last iteration of the loop to the PPE. Then, each partition assigned to the SPE elements would naturally fall on boundaries, e.g., 16 bytes, and thus incurs no alignment issue.

The code in accordance with the invention would look as follow:

```
PPE:    for(i=0; i<2; i++) a[i+1] = ...;
        i=8191;a[i+1]...;
SPEs:   for(i=max(4, 1K*PID−1); i<1K*(PID+1)−1; i++) a[i+1] = ...;
``` where the PID corresponds to the process id associated with each of the 8 SPEs, and ranging from 0 to 7, inclusively.

From the above example, it is seen that, in contrast to Table 1, the present invention partitions alignment sensitive tasks by assigning multiples of 4 to each SPE, so that the SIMD computations can be directly loaded into the local memory. Further, for loops beginning at values of a1-a3, such that the task would be out of alignment, these tasks are partitioned to the PPE. Moreover, the task associated with a8192 is also partitioned to PPE. As a result, the present invention employs a partitioning scheme as shown, by way of example, in Table 2.

TABLE 2

|  | PPE | SPE0 | SPE1 | SPE2 | ... | SPE6 | SPE7 |
|---|---|---|---|---|---|---|---|
| a[i] computed | 1–3, 8192 | 4...1023 | 1024...2047 | 2048...3071 | ... | 6144...7167 | 7168...8191 |

Thus, the start of each SPE begins with a multiple of 4, such that the SPEs can be directly loaded from the SIMD registers, and the non-alignment is avoided in the SPEs and computed instead in the PPE, which is not alignment sensitive.

Figure 7:
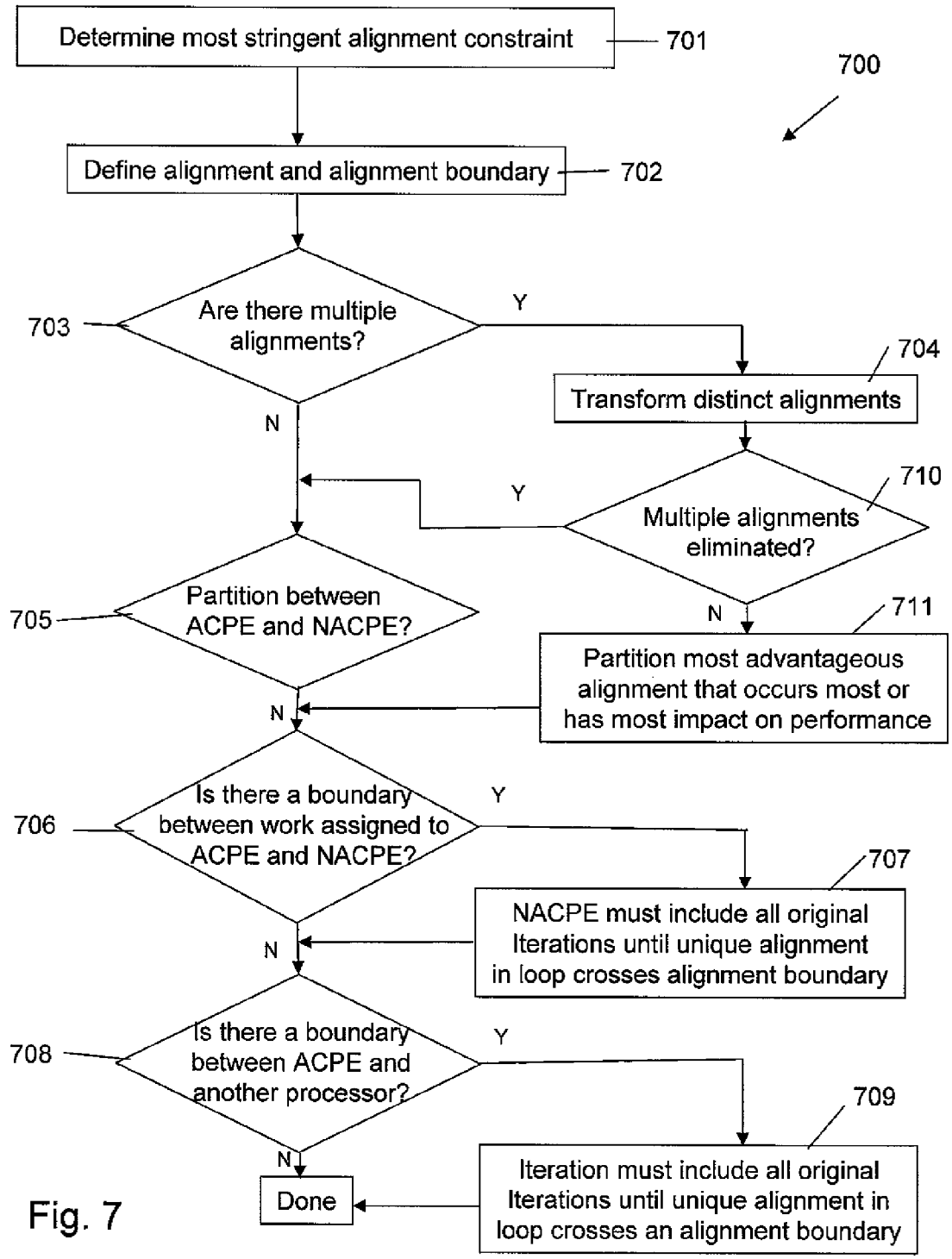
FIG. 7 illustrates a flow diagram of an exemplary embodiment of the invention.

In view of the foregoing, a flow diagram of an exemplary main partition algorithm 700 is illustrated in FIG. 7. As shown, the exemplary algorithm shows:

In step 701, the most stringent alignment constraint in the heterogeneous system, e.g., A, is determined, whereby all alignment and alignment boundary will be with respect to A are defined in step 702.

For the target loop parallel region, step 703 determines if there are multiple distinct alignments. When applicable, step 704 uses loop transformations to transform the distinct alignment in the loop into a unique alignment. Examples of transformations are, but not limited to, selective peeling of individual statements or loop distribution.

In step 705, the work is partitioned between alignment constrained processing elements (ACPE) and non-alignment constrained processing elements (NACPE). The work among the NACPE can be assigned using traditional criteria (including but not limited to load balancing, latency hiding, and maximum working set size). The work among the ACPE can also be assigned using traditional criteria (including but not limited to load balancing, latency hiding, and maximum working set size), but where additional consideration for the most constraining alignment boundary may be taken into consideration.

In step 706, loops with single alignment are first considered to determine whether there is a boundary between work assigned to an ACPE and a NACPE, or vice versa. These loops with single alignment can be original loops or the result of applying a transformation, e.g., as in step 704. When there is a boundary between the ACPE and NACPE, work is reassigned to the NACPE in step 707, which includes all original iterations until the unique alignment in the loop cross an alignment boundary with respect to A. Step 708 determines whether there is a boundary between work assigned to an ACPE to any other processing element. If so, the iteration is assigned to the ACPE in step 709 so as to include all original iterations until the unique alignment in the loop cross an alignment boundary with respect to A. It is noted, if the first iteration of the original does not result in an aligned access with respect to A, a NACPE must be assigned to the first iteration. Similarly, if the last iteration of the original loop is not at a boundary with respect to A, then the last iteration must also be assigned to a NACPE.

Step 710 considers loops with multiple distinct alignments, e.g., multiple alignments that could not advantageously be eliminated by transformations in step 704. Moreover, it is not possible to eliminate all boundary conditions since we can satisfy only at most one alignment when judiciously partitioning the work among processing elements. In such case, the most advantageous alignment is partitioned among all alignment in the loop in step 711, for example the alignment that occurs most frequently or that has the most impact on performance. The work is then partitioned in steps 706-708, and interleaved between the work assigned to each ACPE at least work assigned to one NACPE, where the NACPE has sufficient number of iterations as to prevent interactions due to alignment constraints between the two ACPEs in a ACPE-NACPE-ACPE sequence, if any.

In the above descriptions, multiple work partitions can be assigned to a single processing element. So, for example, when partitioning for a single Cell Broadband Engine configuration where there is only one PPE (classified as NACPE as it is an instance of a PowerPC processor that can access random data without alignment constraints), multiple work partition can be assigned to the PPE. In steps 706-708, for example, the first few iterations and the last few iterations of the loop are two distinct work partitions that would both be assigned to a single PPE, as shown in the above exemplary Table 2.

The above algorithm should apply and/or can be extended to all alignment constraints such as the SIMD alignment constraints or the DMA alignment constraints present in a CBE or other system exhibiting similar heterogeneous alignment constraints.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The processes described herein can be implemented in the infrastructure shown in FIG. 1.

In another embodiment, the invention provides a business method that performs the process steps of the invention on a subscription, advertising, and/or fee basis. That is, a service provider, such as a Solution Integrator, could offer to generate optimized code. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed:

1. A process of workload partitioning in a heterogeneous system, comprising:
   determining heterogeneous alignment constraints in the workload and system;
   partitioning first tasks among at least one alignment constrained processing element (ACPE); and
   partitioning second tasks among the at least one non-alignment constrained processing element (NACPE),
   wherein the workload comprises at least one parallel loop or any parallel regions that could be expressed as one or more loops, and the determining of the heterogeneous alignment constraints comprises finding whether there is an alignment boundary between the first tasks and the second tasks, whereas the first tasks comprise loop iterations that process aligned data and the second tasks comprise loop iterations that process misaligned data, and wherein,
   when an alignment boundary is found between the first and second tasks at a beginning of the loop, all iterations of the loop are assigned to the NACPE until at least one of a first alignment boundary or a subsequent alignment boundary is crossed, or
   when an alignment boundary is found between the first and second tasks at an end of the loop, all iterations of the loop past at least one of a last alignment boundary or a prior alignment boundary are assigned to the NACPE.

2. The process in accordance with claim 1, wherein the ACPE comprises one or more synergistic processing element (SPE) and the NACPE comprises one or more power processor element (PPE).

3. The process in accordance with claim 1, wherein the at least one loop comprises one of loops with single alignment or loops with multiple alignments.

4. The process in accordance with claim 3, wherein for loops with multiple alignments, the process comprises transforming the loops with multiple alignments into loops with a unique alignment for the purpose of facilitating the partition of work among ACPE and NACPE.

5. The process in accordance with claim 3, wherein the first and second tasks are partitioned from one of an original loop composed of the loops with single alignment and the transformed loops composed of the loops with multiple alignments that have been transformed into loops with a unique alignment.

6. The process in accordance with claim 1, wherein the workload comprises at least one loop, and, when a first iteration of the at least one loop does not result in an aligned access with respect to an alignment boundary, a NACPE is assigned at least the first iteration.

7. The process in accordance with claim 1, wherein the workload comprises at least one loop, and, when a last iteration of the at least one loop does not result in an aligned access with respect to an alignment boundary, a NACPE is assigned at least the last iteration.

8. The process in accordance with claim 1, wherein the workload comprises at least one loop, at least one of a first iteration and a last iteration of the at least one loop is partitioned to a NACPE.

9. A compiler stored on a computer storage medium comprising:
   a determiner to determine whether heterogeneous alignment constraints occur in a task; and
   a partitioner to assign a first portion of the task to an alignment constrained processing element (ACPE) and to assign a second portion of the task to a non-alignment constrained processing element (NACPE),
   wherein the task comprises at least one parallel loop or any parallel regions that could be expressed as one or more loops, and the determining of the heterogeneous alignment constraints comprises finding whether there is an alignment boundary between the first portion and the second portion of the task, and wherein,
   when an alignment boundary is found between the first portion and the second portion of the task at a beginning of the loop, all iterations of the loop are assigned to the NACPE until at least one of a first alignment boundary or a subsequent alignment boundary is crossed, or
   when an alignment boundary is found between the first portion and the second portion of the task at an end of the loop, all iterations of the loop past at least one of a last alignment boundary or a prior alignment boundary are assigned to the NACPE.

10. The compiler in accordance with claim 9, wherein partitioner operates at run time.

11. The compiler in accordance with claim 9, wherein the partitioner operates at compile time.

12. The compiler in accordance with claim 9, wherein the ACPE comprises a synergistic processing element (SPE) and the NACPE comprises a power processor element (PPE).

13. The compiler in accordance with claim 9, wherein the task comprises a loop, and the determiner determines whether a first iteration of the loop begins at a beginning of a first alignment boundary.

14. The compiler in accordance with claim 9, wherein the task comprises at least one loop, and the determiner determines whether there is an alignment boundary between the first portion and the second portion of the task.

15. The compiler in accordance with claim 14, wherein, when the determiner finds an alignment boundary between the first portion and the second portion of the task at a beginning of the loop, the partitioner assigns all iterations of the loop to the NACPE until the alignment boundary is crossed.

16. The compiler in accordance with claim 14, wherein, when the determiner finds an alignment boundary between the first portion and the second portion of the task at an end of the loop, the partitioner assigns all iterations of the loop to the ACPE until the alignment boundary is crossed.

17. The compiler in accordance with claim 14, wherein the at least one loop comprises one of loops with single alignment or loops with multiple alignments.

18. The compiler in accordance with claim 17, further comprising a transformer structured and arranged to transform the loops with multiple alignments into loops with a unique alignment.

19. The compiler in accordance with claim 17, wherein the first portion and the second portion of the task are partitioned from one of an original loop composed of the loops with single alignment and transformed loops composed of the loops with multiple alignments that have been transformed into loops with a unique alignment.

20. A computer program product comprising a computer useable storage medium including a computer readable program, wherein the computer readable program when executed on a computer causes the computer to:
determine heterogeneous alignment constraints in a task;
partition a first portion of the task to an alignment constrained processing element (ACPE); and
partition a second portion of the task to a non-alignment constrained processing element (NACPE),
wherein the task comprises at least one parallel loop or any parallel regions that could be expressed as one or more loops, and the determining of the heterogeneous alignment constraints comprises finding whether there is an alignment boundary between the first portion and the second portion of the task, and wherein,
when an alignment boundary is found between the first portion and the second portion of the task at a beginning of the loop, all iterations of the loop are assigned to the NACPE until at least one of a first alignment boundary or a subsequent alignment boundary is crossed, or
when an alignment boundary is found between the first portion and the second portion of the task at an end of the loop, all iterations of the loop past at least one of a last alignment boundary or a prior alignment boundary are assigned to the NACPE.

21. The computer program in accordance with claim 20, wherein the task comprises at least one loop, and the computer readable program when executed on the computer causes the computer to determine whether there is an alignment boundary between the first portion and the second portion of the task.

22. The computer program in accordance with claim 21, wherein, when an alignment boundary is found between the first portion and the second portion of the task at a beginning of the loop, the computer readable program when executed on the computer causes the computer to assign all iterations of the loop to the NACPE until the alignment boundary is crossed.

23. The computer program in accordance with claim 21, wherein, when an alignment boundary is found between the first portion and the second portion of the task at an end of the loop, the computer readable program when executed on the computer causes the computer to assign all iterations of the loop to the ACPE until the alignment boundary is crossed.

24. The computer program in accordance with claim 21, wherein the at least one loop comprises one of loops with single alignment or loops with multiple alignments.

25. The computer program in accordance with claim 20, wherein the task comprises at least one loops, and, when a first iteration of the at least one loop does not result in an aligned access with respect to an alignment boundary, the computer readable program when executed on the computer causes the computer to assign the NACPE at least the first iteration.

26. The computer program in accordance with claim 20, wherein the task comprises at least one loop, and, when a last iteration of the at least one loop does not result in an aligned access with respect to an alignment boundary, the computer readable program when executed on the computer causes the computer to assign the ACPE at least the last iteration.

27. A system comprising a compiler stored on a computer readable storage medium, the compiler loading data associated with a requested task and including instructions that, when executed by the system, cause the system to:
determine heterogeneous alignment constraints in a task;
partition a portion of the task to an alignment constrained processing element; and
partition a remaining portion of the task to a non-alignment constrained processing element,
wherein the task comprises at least one parallel loop or any parallel regions that could be expressed as one or more loops, and the determining of the heterogeneous alignment constraints comprises finding whether there is an alignment boundary between the portion and the remaining portion of the task, and wherein,
when an alignment boundary is found between the portion and the remaining portion of the task at a beginning of the loop, all iterations of the loop are assigned to the NACPE until at least one of a first alignment boundary or a subsequent alignment boundary is crossed, or
when an alignment boundary is found between the portion and the remaining portion of the task at an end of the loop, all iterations of the loop past at least one of a last alignment boundary or a prior alignment boundary are assigned to the NACPE.

28. The system in accordance with claim 27, wherein the compiler operates on the task at run time.

29. The system in accordance with claim 27, wherein the compiler operates on the task at compile time.

30. The system in accordance with claim 27, wherein the compiler operates on the task at a combination of compile time and run time.

31. A process of workload partitioning of computing at least one loop in a heterogeneous system, comprising:
determining, from a first iteration, how many iterations of the loop occur between a first alignment boundary and a next alignment boundary;
partitioning each determined iteration to a non-alignment constrained processor element (NACPE); and
partitioning a remaining portion of the iterations of the loop to a plurality of alignment constrained processing elements (ACPEs), wherein a first data address for each ACPE is a beginning of an alignment boundary,
wherein when the alignment boundary is found between portions of a task at a beginning of the at least one loop, all iterations of the at least one loop are assigned to the NACPE until at least one of a first alignment boundary or the next alignment boundary is crossed, or
when an alignment boundary is found between the portions of the task at an end of the at least one loop, all iterations of the at least one loop past at least one of a last alignment boundary or a prior alignment boundary are assigned to the NACPE.

32. The process in accordance with claim 31, further comprising:
determining a number of iterations occurring after a last alignment boundary; and
partitioning the determined number of iterations to the NACPE.

* * * * *